US012476026B2

(12) United States Patent
Nishi et al.

(10) Patent No.: US 12,476,026 B2
(45) Date of Patent: Nov. 18, 2025

(54) INSULATED WIRE AND METHOD FOR MANUFACTURING INSULATED WIRE

(71) Applicant: PROTERIAL, LTD., Tokyo (JP)

(72) Inventors: Hajime Nishi, Tokyo (JP); Takami Ushiwata, Tokyo (JP); Yuki Honda, Tokyo (JP)

(73) Assignee: Proterial, Ltd., Tokyo (JP)

( * ) Notice: Subject to any disclaimer, the term of this patent is extended or adjusted under 35 U.S.C. 154(b) by 154 days.

(21) Appl. No.: 18/222,578

(22) Filed: Jul. 17, 2023

(65) Prior Publication Data

US 2024/0029923 A1 Jan. 25, 2024

(30) Foreign Application Priority Data

Jul. 22, 2022 (JP) ................................ 2022-117253

(51) Int. Cl.
*H01B 7/02* (2006.01)
*H01B 13/06* (2006.01)

(52) U.S. Cl.
CPC ......... *H01B 13/065* (2013.01); *H01B 7/0225* (2013.01)

(58) Field of Classification Search
CPC .......... H01B 3/30; H01B 3/303; H01B 3/306; H01B 3/308; H01B 3/427; H01B 3/44; H01B 3/46; H01B 7/009; H01B 7/02; H01B 7/0216; H01B 7/0225; H01B 7/18; H01B 7/28; H01B 7/2813; H01B 7/29; H01B 7/04; H01B 13/0016; H01B 13/06; H01B 13/065
USPC ......................................... 174/110 R–122 SR
See application file for complete search history.

(56) References Cited

U.S. PATENT DOCUMENTS

| | | | | |
|---|---|---|---|---|
| 7,982,132 B2 * | 7/2011 | Hopkinson | H01B 11/06 | 174/113 R |
| 9,424,961 B2 * | 8/2016 | Oya | H01F 27/30 | |
| 10,483,013 B2 * | 11/2019 | Oya | H01B 7/00 | |
| 10,777,335 B2 * | 9/2020 | Nakano | H02K 3/30 | |
| 2010/0096159 A1 * | 4/2010 | Abe | H01B 13/16 | 427/119 |
| 2012/0090871 A1 * | 4/2012 | Kato | H01B 3/447 | 174/120 SR |
| 2012/0285724 A1 * | 11/2012 | Oya | H01B 3/427 | 174/120 C |
| 2014/0066314 A1 * | 3/2014 | Maeda | H10N 60/203 | 174/110 SR |

(Continued)

FOREIGN PATENT DOCUMENTS

| | | | |
|---|---|---|---|
| EP | 4156470 A1 * | 3/2023 | H01B 13/06 |
| JP | 2012048919 A * | 3/2012 | H01B 13/16 |

(Continued)

OTHER PUBLICATIONS

Extended European Search Report issued on Dec. 18, 2023, in corresponding European Application No. 23186449.7.

*Primary Examiner* — William H. Mayo, III
(74) *Attorney, Agent, or Firm* — Meunier Carlin & Curfman LLC

(57) ABSTRACT

An insulated wire includes a conductor having an elongated shape and an insulating coating. The insulating coating is provided around the conductor. The insulating coating is formed by laminating multiple insulating layers, each of which includes pores.

9 Claims, 10 Drawing Sheets

(56) References Cited

U.S. PATENT DOCUMENTS

| | | | | |
|---|---|---|---|---|
| 2015/0034360 | A1* | 2/2015 | Muto | C08K 3/22<br>174/110 SR |
| 2015/0325333 | A1* | 11/2015 | Muto | H02K 3/30<br>428/376 |
| 2016/0055940 | A1* | 2/2016 | Oya | H01B 13/065<br>174/110 SR |
| 2017/0236618 | A1 | 8/2017 | Fujimori et al. | |
| 2019/0371496 | A1* | 12/2019 | Ota | H02K 3/32 |
| 2023/0099568 | A1* | 3/2023 | Nishi | H01B 13/06<br>174/120 R |

FOREIGN PATENT DOCUMENTS

| | | | | | |
|---|---|---|---|---|---|
| JP | 2013187029 | A | * | 9/2013 | H01B 13/16 |
| JP | 2016044288 | A | | 4/2016 | |
| JP | 2016091865 | A | * | 5/2016 | H01B 7/02 |
| JP | 2018009117 | A | * | 1/2018 | H01B 13/24 |
| JP | 2018067516 | A | * | 4/2018 | H01B 13/16 |
| JP | 2020035750 | A | | 3/2020 | |
| WO | WO-2021210336 | A | * | 10/2021 | H01B 13/16 |

* cited by examiner

| ITEM | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | EXAMPLE 1 | EXAMPLE 2 | EXAMPLE 3 | EXAMPLE 4 | EXAMPLE 5 |
|---|---|---|---|---|---|---|---|---|---|---|
| **DIE SEQUENCE** | CONVENTIONAL | | | | | INVENTION OF PRESENT APPLICATION | | | | |
| **COATING STRUCTURE OF INSULATING** | SINGLE | | TRIPLE | | DOUBLE | SINGLE | | TRIPLE | | DOUBLE |
| **INSULATING MATERIAL OF INSULATING COATING** | ALL LAYERS: WHOLLY AROMATIC POLYIMIDE | | | | | ALL LAYERS: WHOLLY AROMATIC POLYIMIDE | | | | |
| CONTENT OF PORE FORMING AGENT | ALL LAYERS : 40phr | | INNER LAYER,OUTER LAYER : 40phr INTERMEDIATE LAYER : 25phr | | INNER LAYER: N/A OUTER LAYER : 60phr | ALL LAYERS : 40phr | | INNER LAYER,OUTER LAYER : 40phr INTERMEDIATE LAYER : 25phr | | INNER LAYER: N/A OUTER LAYER : 60phr |
| POROSITY (%) | 20.8 | 24.8 | 25.6 | 27.8 | 35.7 | 27.1 | 26.8 | 24.8 | 28.6 | 43.7 |
| RELATIVE PERMITTIVITY εr | 2.47 | 2.72 | 2.36 | 2.31 | 2.09 | 2.38 | 3.24 | 2.23 | 2.17 | 1.80 |
| THICKNESS DIFFERENCE (μm) | 0.7 | 0.8 | 0.8 | 0.9 | 1.0 | 0.4 | 0.5 | 0.2 | 0.4 | 0.1 |
| **THICKNESS UNEVENNESS RATE (%)** | 70.8 | 74.8 | 81.6 | 84.3 | 85.3 | 88.2 | 86.8 | 87.3 | 85.4 | 96.7 |
| INSULATING PROPERTY | ○ | × | × | × | × | ○ | ○ | ○ | ○ | ○ |
| APPEARANCE | × | × | ○ | × | ○ | ○ | ○ | ○ | ○ | ○ |

FIG. 7

INSULATED WIRE AND METHOD FOR MANUFACTURING INSULATED WIRE

CROSS-REFERENCE TO RELATED APPLICATIONS

This application claims the benefit of the priority based on Japanese Patent Application No. 2022-117253 filed on Jul. 22, 2022 with the Japan Patent Office, the entire disclosure of which is incorporated herein by reference.

BACKGROUND

The present disclosure relates to an insulated wire and a method for manufacturing the insulated wire.

Regarding insulated wires (also referred to as "enameled wires") to be used in electric appliances that employ inverter control, there is, for example, a technique of forming pores inside an insulating coating (also referred to as "enamel coating") to thereby lower relative permittivity of the enamel coating (for example, see Japanese Patent No. 6730930). The relative permittivity (εr) in the pore is 1.0.

Specifically, a pore forming enamel coating material is used and calcined (burned) to thereby form the pores inside the enamel coating. The pore forming enamel coating material is prepared by mixing a pore forming agent with an enamel coating material that contains a resin component, which is a resin consisting of polyimide (also referred to as "PI") and/or polyamide-imide (also referred to as "PAI"). The pore forming agent is a solvent with a high boiling point such as diethylene glycol dibutyl ether. The pore forming agent of 70 per hundred resin (phr) or more is mixed with respect to the resin component of the coating material.

SUMMARY

There has been a problem that an insulated wire comprising an enamel coating with pores is prone to have a defect in its appearance and/or to be degraded in its insulating property, as compared to an insulated wire comprising an enamel coating without pores.

The present disclosure is made so as to solve the problems described above, and aims to provide an insulated wire that can easily suppress occurrence of a defect in appearance and decrease in an insulating property of an insulating coating with pores, and a method for manufacturing the insulated wire.

In order to achieve the object described above, the present disclosure provides the following means.

A first aspect of the present disclosure provides an insulated wire. The insulated wire comprises a conductor having an elongated shape and an insulating coating. The insulating coating is provided around the conductor. The insulating coating is formed by laminating multiple insulating layers. Each insulating layer includes pores. The insulating coating includes a thick portion having the largest thickness, and a thin portion having the smallest thickness. When an average value of respective thicknesses of the multiple insulating layers at the thick portion is defined as a first thickness and an average value of respective thicknesses of the multiple insulating layers at the thin portion is defined as a second thickness, a value of a thickness difference between the first thickness and the second thickness is 0.5 μm or less.

In the insulated wire according to the first aspect of the present disclosure, by setting the value of the thickness difference to 0.5 μm or less, thickness unevenness in the insulating layer with the pores can be suppressed. Occurrence of a defect in appearance and decrease in an insulating property resulting from the thickness unevenness can be easily reduced.

A second aspect of the present disclosure provides a method for manufacturing an insulated wire. The method for manufacturing an insulated wire includes a first application process, a first thickness adjusting process, and a first insulating layer forming process. The first application process includes applying a coating material containing a polyamide acid to a circumference of a conductor. The coating material is obtained by (i) adding a pore forming agent to a solvent by a specific part by weight with respect to a resin component in the coating material before synthesis, and (ii) stirring and mixing the coating material. The first thickness adjusting process includes inserting the conductor applied with the coating material through a first through-hole of a first die, to thereby adjust a thickness of the coating material applied to the circumference of the conductor to a specific thickness. The first insulating layer forming process includes:

- heating the coating material having the specific thickness to a specific temperature, to thereby remove the solvent in the coating material;
- imidizing the polyamide acid contained in the coating material in a state where phase separation occurs between the pore forming agent and the polyamide acid; and
- thermally decomposing or vaporizing the pore forming agent contained in the coating material, to thereby form an insulating layer.

The resin component and the pore forming agent are regarded as apparent non-volatile components. A thickness of the insulating layer is determined based on the apparent non-volatile components.

In the method for manufacturing an insulated wire according to the second aspect of the present disclosure, the thickness unevenness does not easily occur even when the insulating coating with the pores is formed. The occurrence of the defect in appearance and the decrease in the insulating property resulting from the thickness unevenness can be easily reduced.

The insulated wire and the method for manufacturing the insulated wire in the present disclosure exhibit an effect of easily reducing the occurrence of the defect in appearance and the decrease in the insulating property, of the insulating coating with the pores.

BRIEF DESCRIPTION OF THE DRAWINGS

Hereinafter, an example embodiment of the present disclosure will be described with reference to the accompanying drawings, in which:

FIG. 7 is a table illustrating evaluation of the insulated wire;

DETAILED DESCRIPTION OF THE PREFERRED EMBODIMENTS

Figure 1:
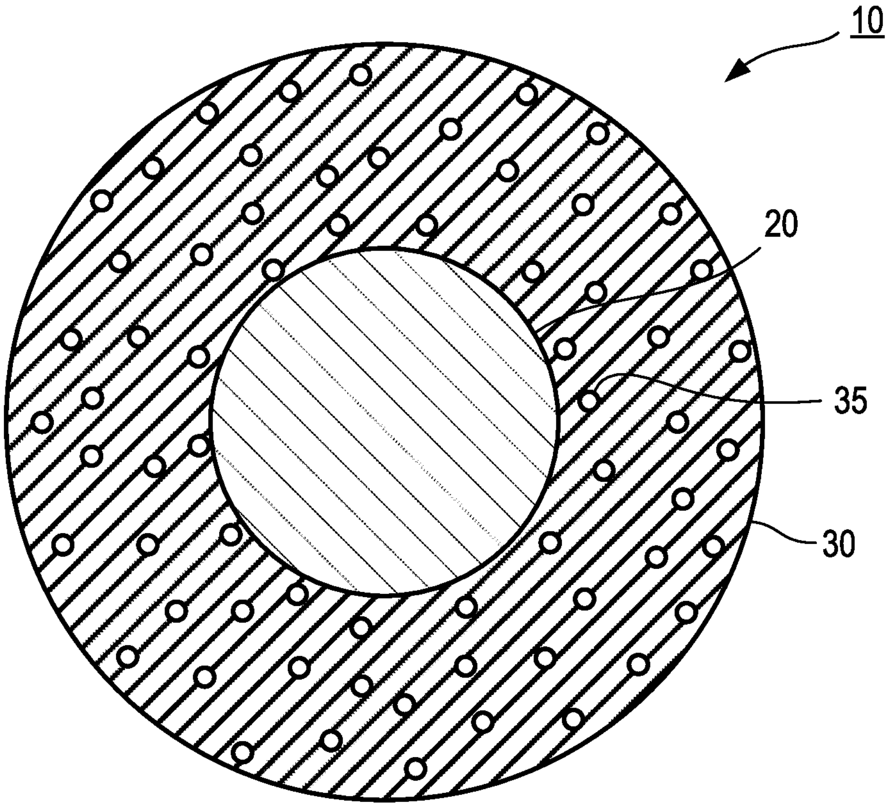
FIG. 1 is a traverse sectional view illustrating a configuration of an insulated wire according to the present embodiment.

Findings of the Inventors that Led to the Present Disclosure

In a case where a conductor is applied with an enamel coating material not mixed with a pore forming agent, the enamel coating material is applied to a circumference of the conductor and the applied enamel coating material is calcined. As a result, an insulating layer having a desired thickness is formed around the conductor. This process of performing coating and calcining so as to form one insulating layer is regarded as one cycle. By repeating this process for several to several dozens of cycles, an insulating coating consisting of multiple insulating layers is formed around the conductor. The enamel coating material referred herein means a coating material that does not produce pores in an enameled coating to be formed by calcining the same.

The enamel coating material is applied to the conductor or the conductor provided with the insulating layer (hereinafter, referred to as "conductor or the like"). The conductor or the like applied with the enamel coating material passes through a hole provided in a coating die (also referred to as "die") for adjusting the applied enamel coating material to a desired thickness. The die removes a portion of the applied enamel coating material of the conductor or the like exceeding the desired thickness. There remains the enamel coating material of the desired thickness on the conductor or the like that has passed through the die.

The hole provided in the die has a diameter (also referred to as "die diameter") determined such that the thickness of the insulating layer in each cycle is substantially the same. Specifically, the die diameter is determined based on a ratio of a non-volatile component contained in the enamel coating material such as resin.

However, in the case of a pore forming enamel coating material containing the pore forming agent in the enamel coating material, following problems arise when the die diameter is determined based on the ratio of the non-volatile component such as resin, as in the case of the enamel coating material.

When the pore forming enamel coating material is used, the pore forming agent is thermally decomposed and/or evaporates during calcination, whereby pores are formed inside the insulating layer. In the case of forming the insulating layer with the pore forming enamel coating material, the insulating layer is thickened as compared to the case where the insulating layer is formed with the enamel coating material that does not produce pores. If the insulating layer becomes thick, a gap that is a difference between an outer diameter of the conductor or the like in the outermost insulating layer and the die diameter of the die to be used for forming a next insulating layer becomes narrow with respect to a designed value.

This means that a coating thickness of the pore forming enamel coating material to be applied next becomes thinner than a designed value. It was found that the insulating coating formed using the pore forming enamel coating material causes a defect that thicknesses of adjacent insulating layers are not the same (i.e., differ from the thickness desired as the designed value) in a thickness direction of the insulating coating.

Moreover, it was found that, as the gap that is the difference between the outer diameter of the conductor or the like in the outermost insulating layer and the die diameter of the die to be used for forming the next insulating layer becomes narrow with respect to the designed value because of the thickening of the insulating layer, a defect that the thickness of the insulating layer becomes uneven is caused (also said as "thickness unevenness occurs") even in the same cycle.

The cause of the defect is considered as follows. That is, when the applied pore forming enamel coating material is calcined in the calcination furnace, the pore forming enamel coating material is heated from its circumference. Thus, an outer circumferential portion of the pore forming enamel coating material is first calcined and cured prior to an inner circumferential portion of the pore forming enamel coating material, and a solvent that has not been volatilized tends to remain in the inner circumferential portion. The remaining solvent is heated through the calcination and expands in volume, thereby forming a void inside the insulating coating.

In the pore forming enamel coating material, a thermal energy to be applied during the calcination is also used when the pores are formed by the pore forming agent. In other words, the pore forming enamel coating material tends to suffer shortage of the thermal energy to be used for volatilizing the solvent during the calcination. Thus, the insulating layer formed by using the pore forming enamel coating material tends to include the void therein as compared to the case of the insulating layer formed by using the enamel coating material that does not produce the pores.

It was found that, if the void is formed in the insulating layer, the enameled wire is prone to have a defect in appearance when the insulating coating consisting of a plurality of the insulating layers is formed around the conductor. Moreover, it was also found that an electric discharge occurs through the void formed inside the insulating layer, thereby decreasing an insulating property of the enameled wire.

The present disclosure was made based on the findings described above.

Reference is made to FIGS. 1 to 10 to describe an insulated wire 10 and a method for manufacturing the insulated wire 10 according to an embodiment of the present disclosure. In the present embodiment, a description will be given by applying the present disclosure to an example in which the insulated wire 10 is an enameled wire, specifically an enameled wire to be used for a winding of a motor. More specifically, a description will be given by applying the present disclosure to an example in which the insulated wire 10 is an enameled wire to be used for a winding of a drive motor of an electric powered vehicle, such as a hybrid electric vehicle (HEV), an electric vehicle (EV), and a plugin hybrid electric vehicle (PHEV).

FIG. 1 is a traverse sectional view illustrating a configuration of the insulated wire 10 of the present embodiment. As shown in FIG. 1, the insulated wire 10 comprises a conductor 20 and an insulating coating 30 including multiple pores 35.

The conductor 20 is a member extending in an elongated shape and having a circular shape in a cross-section. In the present embodiment, a description will be given by applying the present disclosure to an example in which the conductor 20 is a round copper wire having a diameter of approximately 0.8 mm. It should be noted that the cross-section shape of the conductor 20 may be circular or rectangular, and is not limited to a specific shape.

The conductor 20 is formed by using a metallic material generally used as an electrical wire. Examples of the metallic material for forming the conductor 20 may include copper, an alloy containing copper, aluminum, or an alloy containing aluminum. In the present embodiment, a description will be given by applying the present disclosure to an example in which the conductor 20 is formed by using low-oxygen copper with an oxygen content of 30 ppm or less or oxygen-free copper.

The insulating coating 30 is a member to surround the conductor 20. The insulating coating 30 is formed by using a material having an insulating property and a thermosetting property (that is, an insulating material). Examples of the material having the insulating property and the thermosetting property may include polyimide and polyamide-imide.

In the present embodiment, a description will be given by applying the present disclosure to an example in which the insulating coating 30 is made from a wholly aromatic polyimide (hereinafter, simply referred to as "polyimide"). A specific method for forming the insulating coating 30 will be described later.

The insulating coating 30 is formed by laminating multiple insulating layers 33. In the present embodiment, the insulating coating 30 consists of twelve layers of the insulating layers 33. The insulating coating 30 has a thickness of approximately 40 μm.

It should be noted that the thickness of the insulating coating 30 may be larger or smaller than 40 μm. For example, the thickness of the insulating coating 30 may have a value in a range between 10 μm and 200 μm inclusive. Moreover, the layer number of the insulating layers 33 forming the insulating coating 30 may be greater or less than the twelve layers.

Figure 2:
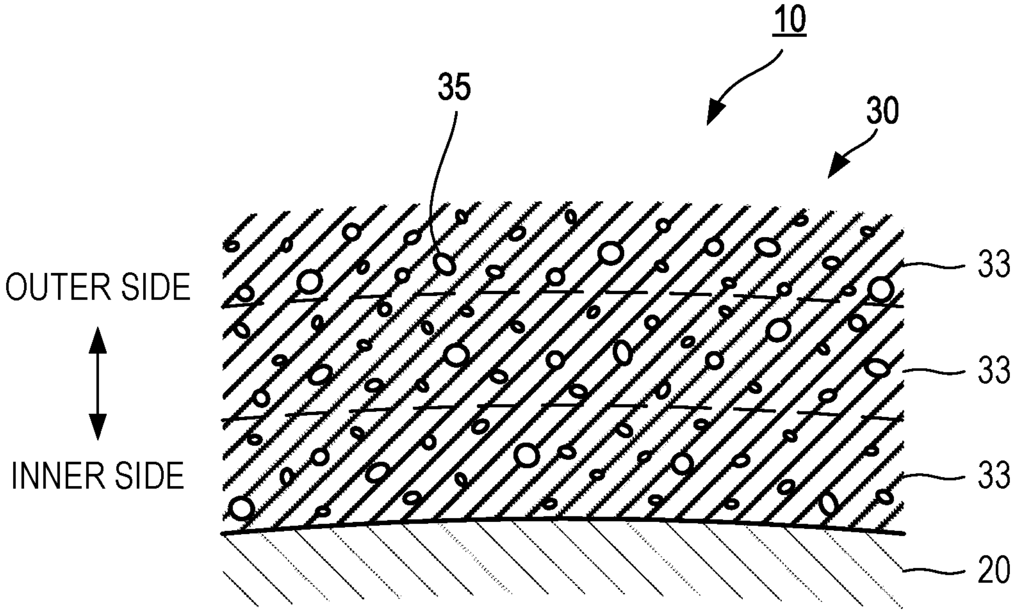
FIG. 2 is a schematic view illustrating a configuration of insulating layers in an insulating coating in FIG. 1.

As shown in FIG. 2, the multiple insulating layers 33 are laminated such that the inner most insulating layer 33 abuts an outer circumferential surface of the conductor 20, and covers a circumference of the conductor 20. Each insulating layer 33 includes multiple pores 35. By including the multiple pores 35 inside the insulating layer 33, it becomes easy to lower a relative permittivity of the insulating coating 30.

Each pore 35 is a space containing a gas therein. The gas includes an air and a gas generated when a pore forming agent (described later) made from a pyrolytic polymer and a solvent with a high boiling point is thermally decomposed and/or vaporized. It should be noted that a major part of the gas contained in the pore 35 is considered to be the air.

Figure 3:
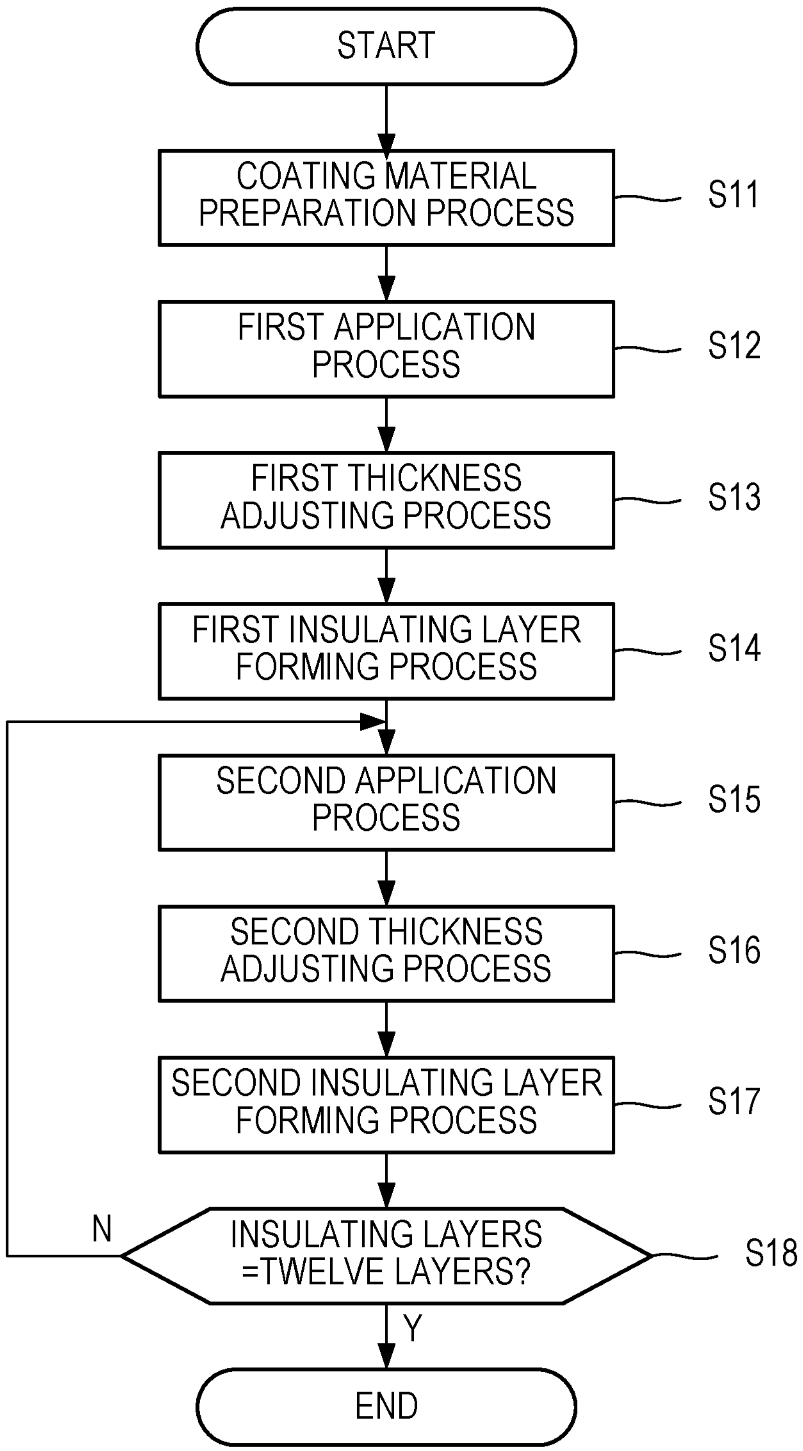
FIG. 3 is a flowchart illustrating a method for manufacturing the insulated wire in FIG. 1.

Next, reference is made to FIG. 3 to describe a method for manufacturing the insulated wire 10 described above. Specifically, a description will be given of a method for manufacturing the insulating coating 30 of the insulated wire 10. FIG. 3 is a flowchart illustrating the method for manufacturing the insulated wire 10.

In S11, a coating material preparation process is performed so as to prepare a coating material for forming the insulating coating 30 of the insulated wire 10. Specifically, first, a process to stir and synthesize a polyamide acid in a solvent is performed. Before the stirring and synthesizing, a coating material (also referred to as "pre-synthesis coating material") contains, in its solvent, a polyimide monomer consisting of diamine and tetracarboxylic dianhydride as a resin component. Then, the pore forming agent consisting of the pyrolytic polymer is added at a ratio of a specific part by weight with respect to the resin component of the pre-synthesis coating material. Subsequently, the polyimide monomer in the pre-synthesis coating material is stirred and mixed in the solvent, whereby a coating material (i.e., pore forming enamel coating material) containing the polyamide acid is obtained. The pore forming agent is an agent configured to form pores inside the insulating coating 30 when thermally decomposed and/or vaporized in the coating material during the calcination.

In the coating material in the present disclosure, the pore forming agent is regarded as a non-volatile component like the resin component. Thus, the resin component and the pore forming agent are regarded as apparent non-volatile components. When the coating material is prepared, content ratios of the solvent, the resin component, and the pore forming agent contained in the coating material are determined such that the thickness of the insulating layer 33 to be formed around the conductor 20 is determined based on the apparent non-volatile components consisting of the resin component and the pore forming agent.

With respect to the resin component in the pre-synthesis coating material, the pore forming agent of, for example, 10 parts by weight (per hundred resin (phr)) or more and 60 parts by weight or less (corresponding to the "specific parts by weight") consisting of the pyrolytic polymer is added. In the present embodiment, the pore forming agent of 40 parts by weight is added. The pore forming agent may be a solvent with a high boiling point in place of the pyrolytic polymer.

The polyamide acid is a precursor of polyimide, which is an insulating material forming the insulating coating 30. The polyamide acid may be any type that can be used for manufacturing a known insulated wire, and is not limited to a specific type.

In the present embodiment, a description will be given by applying the present discloser to an example in which the polyamide acid is obtained by polymerizing diamine and tetracarboxylic dianhydride.

Examples of the diamine to be used may include 1,4-bis (4-aminophenoxy) benzene (TPE-Q), 1,3-bis (4-aminophenoxy) benzene (TPE-R), 1,3-bis (3-aminophenoxy) benzene (APB), 4,4'-bis (4-aminophenoxy) biphenyl (BODA), and 4,4'-diaminodiphenyl ether (ODA). In the insulated wire 10 in the present embodiment, the insulating coating 30 is formed from the wholly-aromatic polyimide, in which 4,4'-diaminodiphenyl ether and 4,4'-bis (4-aminophenoxy) biphenyl are used as the diamine.

Examples of the tetracarboxylic dianhydride to be used may include 3,3',4,4'-benzophenone tetracarboxylic dianhydride (BTDA), 3,3',4,4'-diphenyl sulfone tetracarboxylic dianhydride (DSDA), 4,4'-oxydiphthalic dianhydride (ODPA), 4,4'-(2,2-hexafluoro isopropylidene) diphthalic anhydride (6FDA), pyromellitic dianhydride (PMDA), and 3,3',4,4'-biphenyl tetracarboxylic dianhydride (BPDA). In the insulated wire 10 in the present embodiment, the insulating coating 30 is formed from the wholly-aromatic polyimide, in which the pyromellitic dianhydride and the 3,3',4,4'-biphenyl tetracarboxylic dianhydride are used as the tetracarboxylic dianhydride.

The polyimide, which results from imidization of the above-described polyamide acid and which forms the insulating coating 30, may be a polyamide with polymer ends capped. Examples of a material to be used for capping may include a compound containing acid anhydride or a compound containing amino group.

Examples of the compound containing the acid anhydride to be used for the capping may include phthalic anhydride, 4-methyl phthalic anhydride, 3-methyl phthalic anhydride, 1,2-naphthalic anhydride maleic anhydride, 2,3-naphthalenedicarboxylic anhydride, various fluorinated phthalic anhydrides, various brominated phthalic anhydrides, various chlorinated phthalic anhydrides, 2,3-anthracenedicarboxylic anhydride, 4-ethynyl phthalic anhydride, and 4-phenyl-ethynyl phthalic anhydride.

For the compound containing the amino group to be used for the capping, a compound including one amino group may be used.

Examples of the solvent to be used may include N-methylpyrrolidone (NMP) and dimethylacetamide (DMAc). In the present embodiment, DMAc is used as the solvent.

Examples of the pyrolytic polymer to be used for the pore forming agent may include polypropylene glycol. In the present embodiment, polypropylene glycol of the diol type having a molecular weight of 400 (also referred to as PPG400) is used as the pyrolytic polymer.

Examples of the solvent with a high boiling point to be used for the pore forming agent may include one having a boiling point of 260° C. or higher. For example, oleyl alcohol, 1-tetradecanol, and 1-dodecanol can be used. When 1-tetradecanol or 1-dodecanol is used as the solvent with a high boiling point to be used for the pore forming agent, the size of the pore 35 to be formed in the insulating coating 30 (or the insulating layer 33) can be easily enlarged. Thus, as compared to the case of the pyrolytic polymer, the content of the pore forming agent can be reduced with respect to the coating material, while the porosity in the insulating coating 30 (or the insulating layer 33) can be easily increased.

Subsequently, a first application process is performed in S12, in which the coating material prepared in the coating material preparation process S11 is applied to the circumference of the conductor 20. Specifically, the coating material is applied so as to form the insulating layer 33 abutting the outer circumferential surface of the conductor 20. An applied coating material obtained by applying the coating material is formed in a state of abutting the outer circumferential surface of the conductor 20.

After the applied coating material is formed in the state of abutting the outer circumferential surface of the conductor 20, a first thickness adjusting process is performed in S13 so as to adjust a thickness of the applied coating material. In the first thickness adjusting process S13, the applied coating material formed around the conductor 20 is adjusted to a specific thickness by using a first die 51.

Figure 4:
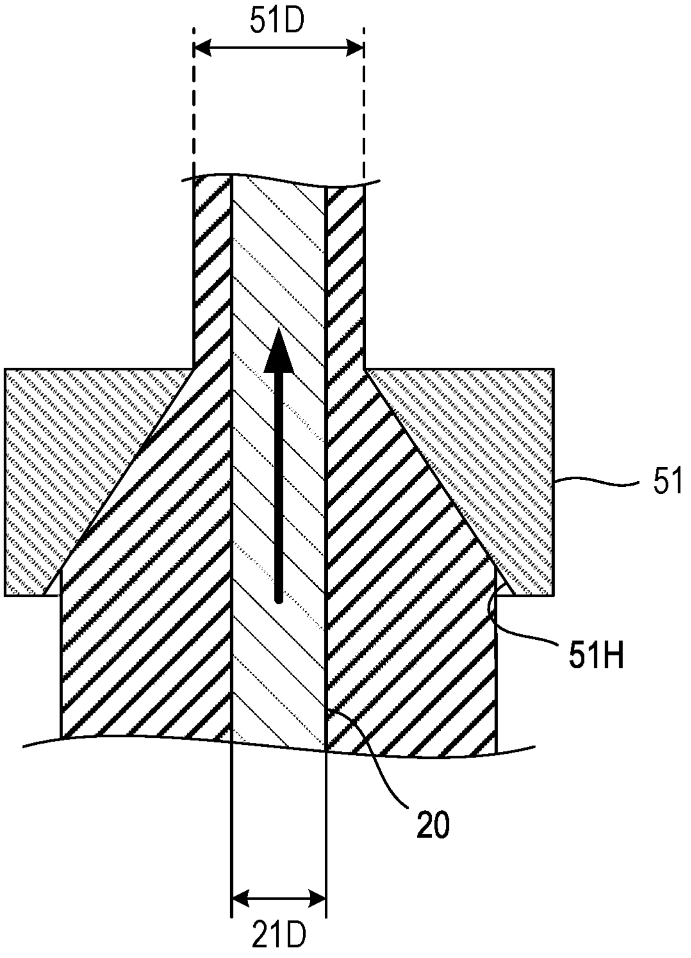
FIG. 4 is a schematic diagram illustrating adjustment of an applied coating material in a first thickness adjusting process.

FIG. 4 is a schematic diagram illustrating the adjustment of the thickness of the applied coating material in the first thickness adjusting process S13. The thickness of the applied coating material formed around the conductor 20 in the first application process S12 is larger than the specific thickness adjusted through the first thickness adjusting process S13. In other words, the thickness of the applied coating material before the applied coating material passes through the first die 51 is larger than the thickness of the applied coating material after the applied coating material passes through the first die 51.

The first die 51 includes a first through-hole 51H for inserting the conductor 20, around which the applied coating material is formed. An inner surface of the first through-hole 51H is formed into a conical shape having a diameter decreasing from an inlet toward an outlet in an insertion direction of the conductor 20.

After the applied coating material consisting of the coating material is formed around the conductor 20, the conductor 20 is inserted through the first through-hole 51H of the first die 51. The first through-hole 51H removes a part of an outer circumferential portion of the applied coating material. As a result, the applied coating material having a thickness corresponding to a diameter of the first through-hole 51H remains on the circumference of the conductor 20.

A diameter of the first through-hole 51H at an outlet-side end for the conductor 20 is referred to as "first die diameter 51D". The diameter of the conductor 20 is referred to as "first wire diameter 21D".

The size of the first die diameter 51D is determined based on the specific thickness after the first thickness adjusting process S13 and the first wire diameter 21D.

Figure 5:
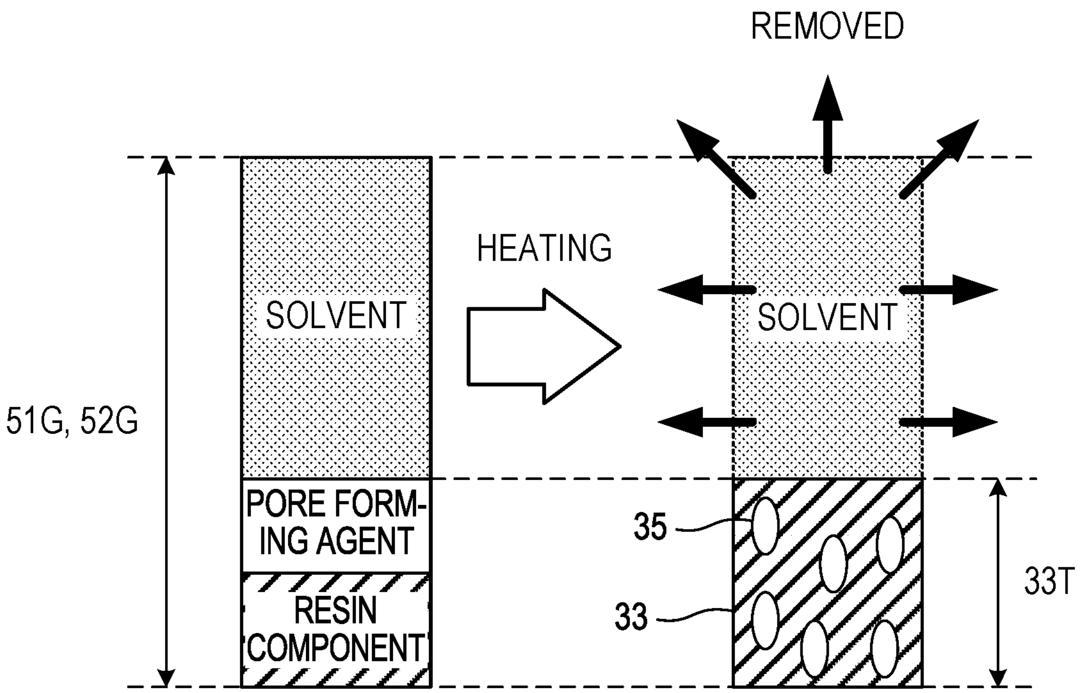
FIG. 5 is a schematic diagram illustrating an idea of determining a first die diameter.

FIG. 5 is a schematic diagram illustrating an idea to determine the size of the first die diameter 51D. A value of a first die gap 51G, which is a half a value of a difference between the first die diameter 51D and the first wire diameter 21D, is the thickness (i.e., the specific thickness) of the applied coating material that has passed through the first die 51. The value of the first die gap 51G is determined based on a sum of volumes of the solvent, the resin component, and the pore forming agent, all of which are contained in the applied coating material having the specific thickness. Ratios of these volumes are adjusted such that a thickness 33T of the insulating layer 33 to be formed after calcination is determined based on a sum of volumes of the resin component and the pore forming agent, which are the apparent non-volatile components.

For example, in a case where the applied coating material after passing through the first die 51 has the specific thickness, when the applied coating material having the specific thickness is calcined and heated in the next process, which is the first insulating layer forming process, the solvent contained in the applied coating material evaporates and is thus removed from the applied coating material. The insulating layer 33 having the thickness 33T (for example, approximately 3 μm) is formed based on a volume obtained by the sum of the volumes of the resin component and the pore forming agent contained in the applied coating material as the apparent non-volatile components.

As described above, the specific thickness of the applied coating material (i.e., the value of the first die gap 51G) is determined based on the sum of the volumes of the solvent, the resin component, and the pore forming agent. The thickness 33T of the insulating layer 33 is determined based on the sum of the volumes of the resin component and the pore forming agent, which are the apparent non-volatile components.

Subsequently, as shown in FIG. 3, the first insulating layer forming process is performed in S14, in which the applied coating material formed around the conductor 20 is heated in a calcination furnace so as to form the insulating layer 33. Specifically, the conductor 20, around which the applied coating material is formed, is placed into the calcination furnace whose temperature is kept in a range from 300° C. through 500° C.

In the calcination furnace, the solvent is removed from the applied coating material due to a high temperature. Subsequently, an imidization reaction of the polyamide acid contained in the applied coating material proceeds in a state where phase separation occurs between the pyrolytic polymer and the polyamide acid, whereby the insulating layer 33 is formed. The pyrolytic polymer, which is the pore forming agent, is thermally decomposed at the same time as the imidization reaction of the polyamide acid. As a result, the multiple pores 35 are formed in the insulating layer 33.

Subsequently, a second application process is performed in S15, in which the coating material prepared in the coating material preparation process S11 is applied to a circumference of the insulating layer 33 formed around the conductor 20. Specifically, a fresh coating material is applied to an outer circumferential surface of the insulating layer 33 formed around the conductor This application work forms an applied coating material on the outer circumferential surface of the insulating layer 33 formed around the conductor 20.

After the applied coating material is formed on the outer circumferential surface of the insulating layer 33, a second thickness adjusting process is performed in S16 so as to adjust the thickness of the applied coating material. In the second thickness adjusting process S16, a thickness of the applied coating material formed around the insulating layer 33 is adjusted to a specific thickness by using a second die 52.

Figure 6:
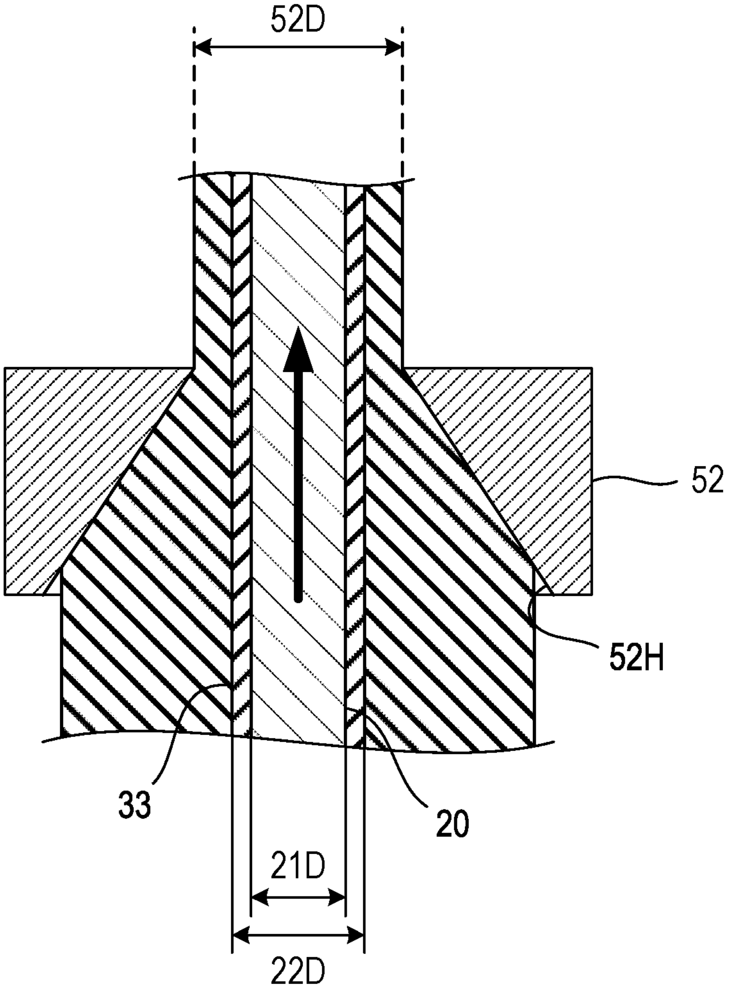
FIG. 6 is a schematic diagram illustrating adjustment of the applied coating material in a second thickness adjusting process.

FIG. 6 is a schematic diagram illustrating adjustment of the applied coating material in the second thickness adjusting process S16. In the second thickness adjusting process S16, the thickness of the applied coating material formed around the insulating layer 33 is larger than the specific thickness after the thickness adjusting process S16. In other words, the thickness of the applied coating material before the applied coating material passes through the second die 52 is larger than the thickness of the applied coating material after the applied coating material passes through the second die 52.

The second die 52 includes a second through-hole 52H for inserting the conductor 20 and the insulating layer 33, around which the applied coating material is formed. An inner surface of the second through-hole 52H is formed into a conical shape having a diameter decreasing from an inlet toward an outlet in the insertion direction of the conductor 20 and the insulating layer 33.

After the applied coating material made of the coating material is formed around the conductor 20 and the insulating layer 33, the conductor 20 and the insulating layer 33 are inserted through the second through-hole 52H of the second die 52. The second through-hole 52H removes a part of an outer circumferential portion of the applied coating material. As a result, the applied coating material having a thickness corresponding to a diameter of the second through-hole 52H remains on the circumference of the conductor 20 and the insulating layer 33

A diameter of the second through-hole 52H, at an outlet-side end for the conductor 20 and the insulating layer 33, is referred to as a second die diameter 52D. A diameter in the insulating layer 33 formed around the conductor 20 is referred to as a second wire diameter 22D.

As with the first die diameter 51D, the size of the second die diameter 52D is determined based on the specific thickness after the second thickness adjusting process S16 and the second wire diameter 22D.

A value of a second die gap 52G, which is a half a value of a difference between the second die diameter 52D and the second wire diameter 22D, is the thickness (i.e., the specific thickness) of the applied coating material after the applied coating material passes through the second die 52. The value of the second die gap 52G is determined based on the sum of the volumes of the solvent, the resin component, and the pore forming agent, all of which are contained in the applied coating material having the specific thickness. Ratios of these volumes are adjusted such that the thickness 33T of the insulating layer 33 to be formed after the calcination is determined based on the sum of the volumes of the resin component and the pore forming agent, which are the apparent non-volatile components.

For example, in a case where the applied coating material has the specific thickness after passing through the second die 52, when the applied coating material having the specific thickness is calcined and heated in the next step, which is a second insulating layer forming process S17, the solvent contained in the applied coating material evaporates and is thus removed from the applied coating material. The insulating layer 33 having the thickness 33T (for example, approximately 3 μm) is formed based on a volume obtained by the sum of the volumes of the resin component and the pore forming agent, which are contained in the applied coating material as the apparent non-volatile components.

As described above, the specific thickness (i.e., the second die gap 52G) of the applied coating material is determined based on the sum of the volumes of the solvent, the resin component, and the pore forming agent. The thickness 33T of the insulating layer 33 is determined based on the sum of the volumes of the resin component and the pore forming agent, which are the apparent non-volatile components.

Subsequently, as shown in FIG. 3, the second insulating layer forming process is performed in S17, in which the applied coating material formed around the conductor 20 and the insulating layer 33 is heated in the calcination furnace so as to form the insulating layer 33. Details of the second insulating layer forming process S17 are the same as the first insulating layer forming process S14 and thus, a description of the second insulating layer forming process S17 is omitted.

If the twelve layers of the insulating layers 33 are not formed (S18: NO), then the present process returns again to the above-described second application process S15 and repeats the process to form the insulating layer 33. As the number of times to repeat processes from the second application process S15 through the second insulating layer forming process S17 increases, the layer number of the insulating layers 33 formed around the conductor 20 increases. The second thickness adjusting process S16 uses a die having a die diameter corresponding to the layer number of the insulating layers 33 formed around the conductor 20. The order to use the first die 51, the second die 52, etc. is also referred to as “die sequence”.

If the twelve layers of the insulating layers 33 are formed (S18: YES), then the present process ends forming the insulating coating 30 consisting of the twelve layers of the insulating layer 33 around the conductor 20.

Next, reference is given to FIG. 7 to describe evaluation of the insulated wire 10 according to the present embodiment. For the evaluation, (i) the insulated wire 10 comprising the insulating coating 30 with a coating structure shown in FIG. 1 (also referred to as “single” or “single coating”); (ii) the insulated wire 10 comprising the insulating coating 30 with a coating structure shown in FIG. 8 (also referred to as “triple” or “triple coating”); and (iii) the insulated wire 10 comprising the insulating coating 30 with a coating structure shown in FIG. 9 (also referred to as “double” or “double coating”) were used.

When the multiple insulating layers constituting the insulating coating are made from the same insulating material, the insulating coating is defined as a single insulating coating consisting of the multiple insulating layers. Among the multiple insulating layers made from the same insulating material, two or more insulating layers formed by using coating materials, which are different in terms of the presence/absence of the pore forming agent, the type of the pore forming agent, or the content of the pore forming agent, are defined as different insulating layers. When the insulating coating consists of multiple different insulating layers formed by using multiple different coating materials, the insulating layers formed by using the same coating material are regarded as one unit. For example, in a direction from the conductor to the outer circumferential surface of the insulating coating, the respective units are referred to as an inner layer and an outer layer (i.e., double layers), or an inner layer, an intermediate layer, and an outer layer (i.e., triple layers).

Even when the inner layer and the outer layer are formed of the same insulating layers, if a different unit formed of the different insulating layer(s) is interposed between the inner layer and the outer layer, the inner layer and the outer layer are regarded as different units.

Examples 1 and 2 used in the evaluation correspond to the insulated wire 10 having the structure shown in FIG. 1. Examples 3 and 4 correspond to the insulated wire 10 having the structure shown in FIG. 8. Example 5 corresponds to the insulated wire 10 having the structure shown in FIG. 9.

Figure 8:
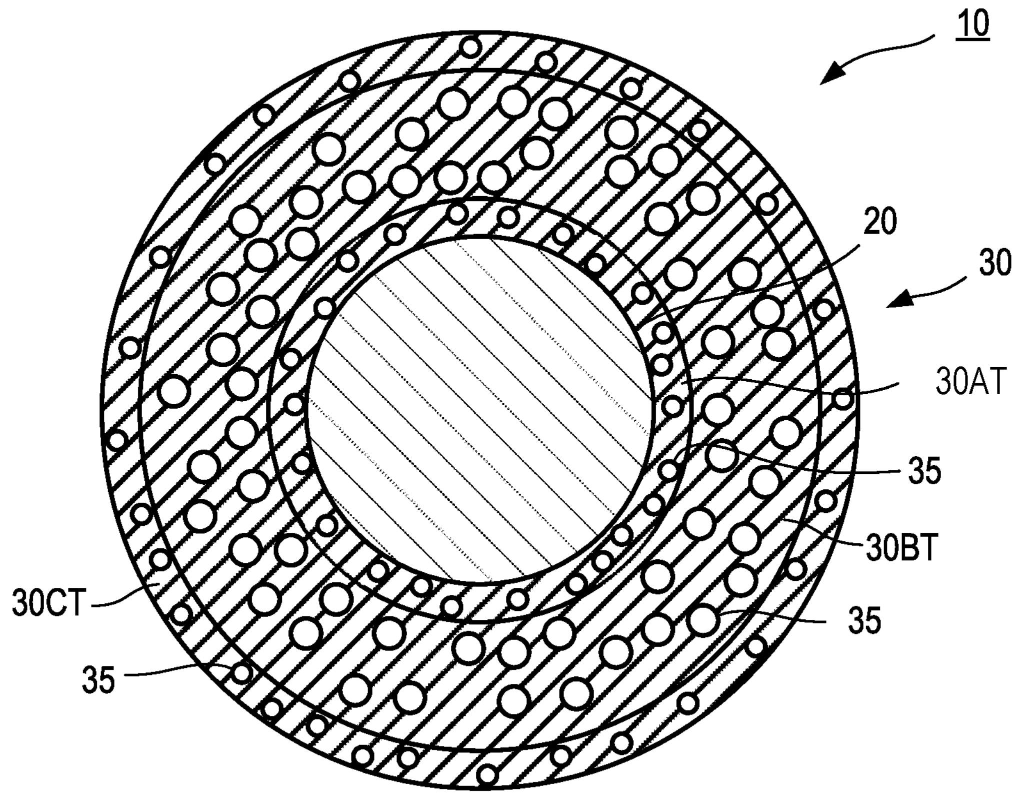
FIG. 8 is a traverse sectional view illustrating a configuration of an insulated wire in the form of a triple coating used for the evaluation.

The insulating coating 30 of the insulated wire 10 shown in FIG. 8 includes an inner layer 30AT, an intermediate layer 30BT, and an outer layer 30CT. The inner layer 30AT consists of two layers of the insulating layers 33. The intermediate layer 30BT consists of eight layers of the insulating layers 33, and the outer layer 30CT consists of two layers of the insulating layers 33.

The insulating layers 33 in the inner layer 30AT and the outer layer 30CT are formed by using the same coating material as the coating material for forming the insulating coating 30 of the insulated wire 10 shown in FIG. 1. The insulating layers 33 in the intermediate layer 30BT are formed by using the same coating material, except that 25 parts by weight of the pore forming agent is added (the insulating layers 33 in the intermediate layer 30BT are formed by using the coating material comprising 1-tetradecanol, which is a solvent with a high boiling point of 260° C. or higher, as the pore forming agent, and comprising the resin component and the solvent, which are the same as those used in the coating material for forming the insulating coating 30 of the insulated wire 10).

Figure 9:
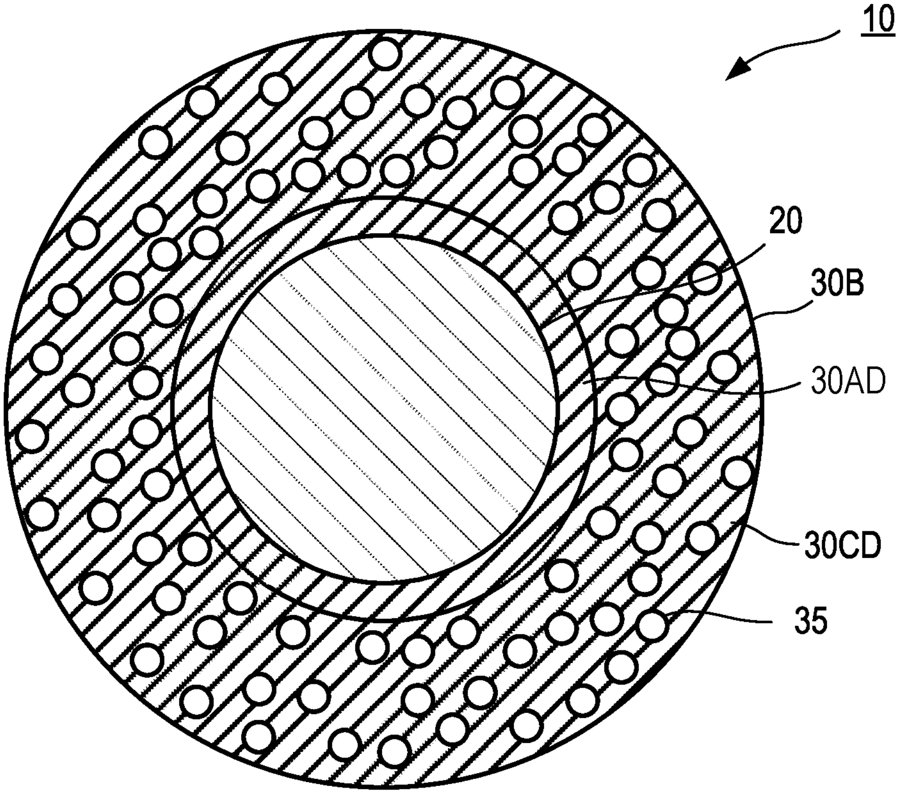
FIG. 9 is a traverse sectional view illustrating a configuration of an insulated wire in the form of a double coating used for the evaluation.

The insulating coating 30 of the insulated wire 10 shown in FIG. 9 includes an inner layer 30AD and an outer layer 30CD. The inner layer 30AD consists of two layers of the insulating layers 33. The outer layer 30CD consists of nine layers of the insulating layers 33.

The insulating layers 33 in the outer layer 30CD are formed by using the same coating material as the coating material for forming the insulating layers 33 in the intermediate layer 30BT of the insulated wire 10 shown in FIG. 8, except that only the content of the pore forming agent is different. The insulating layers 33 in the inner layer 30AD are formed by using the same coating material as the coating material for forming the insulating layers 33 in the outer layer 30CD, except that the pore forming agent is not added.

A description will be given of Comparative Examples 1 to 5, which are to be compared to Examples 1 to 5 described above. As compared to Examples 1 to 5, Comparative Examples 1 to 5 are different in respect of dies to be used for manufacturing the insulated wire 10. In other aspects such as a coating structure of the insulating coating, the component of the coating material for forming the coating structure, Comparative Examples 1 to 5 are the same as Examples 1 to 5.

In the dies used in the manufacturing according to Comparative Examples 1 to 5, determining the value of the die gap is based on a volume ratio of the resin component, which is the non-volatile component contained in the coating material, not on a volume ratio of the resin component and the pore forming agent, which are the apparent non-volatile components contained in the coating material. In other words, the dies used in Comparative Examples 1 to 5 are different from the dies used in Examples 1 to 5 in that the pore forming agent is not taken into consideration. The use order of the multiple dies used in the manufacturing according to Comparative Examples 1 to 5 is also referred to as "conventional die sequence".

Reference is made back to FIG. 7 to describe a porosity (%). The porosity (%) was calculated using the following formula:

$$\text{porosity (\%)}=\{(\rho 1-\rho 2)/\rho 1\}\times 100$$

where "ρ1" is a relative density of the insulating coating 30 without the pores 35, and "ρ2" is a relative density of the insulating coating 30 with the pores 35.

The relative density (ρPI) of the insulating coating 30 is calculated by the following formula.

$$\rho PI = W PI/\{(W\text{insulated wire}/\rho\text{insulated wire})-(W\text{conductor}/\rho\text{conductor})\}$$

The weight (Winsulated wire) and the relative density (ρinsulated wire) of the insulated wire were measured, and thereafter the insulating coating was removed with sodium hydroxide of 300° C. Then, the weight (Wconductor) and the relative density (ρconductor) of the resulting conductor were measured.

The calculated porosity (%) was as follows: 20.8% in Comparative Example 1; 24.8% in Comparative Example 2; 25.6% in Comparative Example 3; 27.8% in Comparative Example 4; 35.7% in Comparative Example 5; 27.1% in Example 1; 26.8% in Example 2; 24.8% in Example 3, 28.6% in Example 4; and 43.7% in Example 5.

The measured relative permittivity (εr) was as follows: 2.47 in Comparative Example; 2.72 in Comparative Example 2; 2.36 in Comparative Example 3; 2.31 in Comparative Example 4; 2.09 in Comparative Example 5; 2.38 in Example 1; 3.24 in Example 2; 2.23 in Example 3; 2.17 in Example 4; and 1.80 in Example 5.

Figure 10:
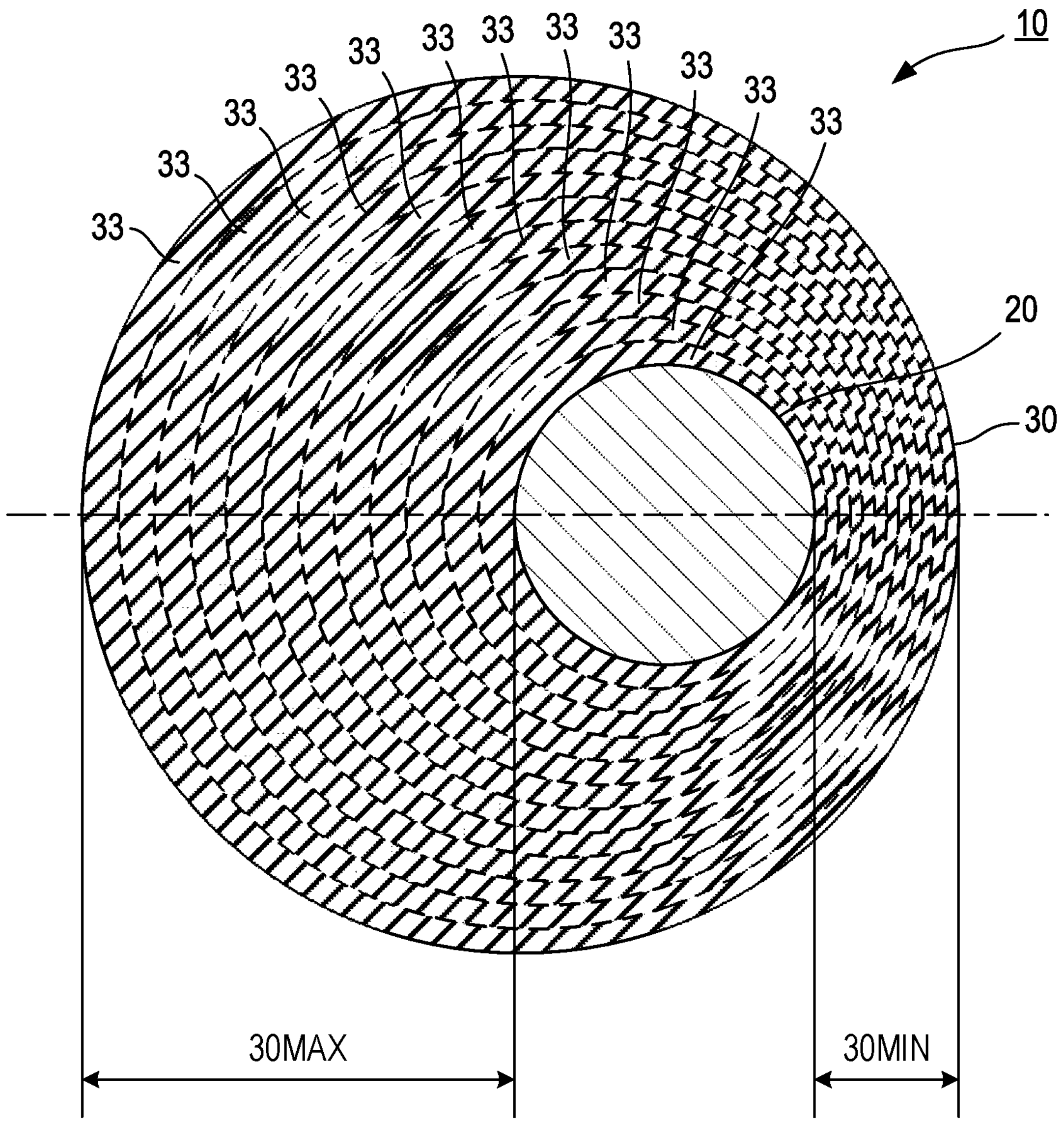
FIG. 10 is a traverse sectional view illustrating a thickness difference in the insulating coating.

Next, a description will be given of evaluation on the thickness difference of the insulated wire 10. FIG. 10 is a traverse sectional view illustrating the thickness difference of the insulating coating 30. The insulating coating 30 includes a thick portion 30MAX and a thin portion 30MIN. The thick portion is the thickest portion, and the thin portion 30MIN is the thinnest portion. The thick portion 30MAX and the thin portion 30MIN are determined by a method described below.

The method described herein uses the digital microscope VHX-6000, the large free-angle observation system VHX-S660, and the dual-objective zoom lens VH-ZST, all of which are manufactured by Keyence Corporation. Observation is performed with an observation light set to "mix" mode.

First, the thickness of the insulating coating 30 at a first position is measured. The first position is a desired position. Subsequently, the thickness of the insulating coating 30 at a second position having a phase different from the first position by 10 degrees with respect to a center of the insulated wire 10 is measured. Furthermore, the thickness of the insulating coating 30 at a third position having a phase different from the second position by 10 degrees with respect to the center of the insulated wire 10 is measured. The measurement of the thickness in that way is performed over the entire circumference of the insulating coating 30.

In other words, the thickness of the insulating coating 30 is measured at the first to thirty-sixth positions. Among the first to thirty-sixth positions, a position where the thickness is the largest is defined as the thick portion 30MAX; and a position where the thickness is the smallest is defined as the thin portion 30MIN. The thick portion 30MAX and the thin portion 30MIN may be in a relation of being arranged differently to each other by 180 degrees as shown in FIG. 10, or degrees different from 180 degrees.

In the multiple positions to measure the thickness of the insulating coating 30 adjacent positions may be different from each other by a phase of 10 degrees, by a phase of degrees smaller than 10 degrees, or by a phase larger than 10 degrees.

Subsequently, respective thicknesses of all the insulating layers 33 in the thick portion 30MAX are measured. An average value of all the measured thicknesses is calculated as a first thickness. Similarly, respective thicknesses of all the insulating layers 33 in the thin portion 30MIN are measured. An average value of all the measured thicknesses is calculated as a second thickness. Then, a thickness difference between the first thickness and the second thickness is calculated. The smaller a value of the thickness difference is, the smaller a difference between the thickness of the thick portion 30MAX and the thickness of the thin portion 30MIN is (also said as "thickness unevenness being small").

The measured thickness difference (μm) was as follows: 0.7 μm in Comparative Example 1; 0.8 μm in Comparative Example 2; 0.8 μm in Comparative Example 3; 0.9 μm in Comparative Example 4; 1.0 μm in Comparative Example 5; 0.4 μm in Example 1; 0.5 μm in Example 2; 0.2 μm in Example 3; 0.4 μm in Example 4; and 0.1 μm in Example 5. The thickness difference in Examples 1 to 5 was 0.5 μm or less.

Next, a description will be given of evaluation on a thickness unevenness rate in the insulated wire 10.

The thickness unevenness rate is a value obtained by a method set forth in JASO D625 of Japanese Automotive Standards Organization. Specifically, the thickness unevenness rate is a value (%) obtained by a formula of (b/a)×100, where "a" is the thickness of the thick portion 30MAX and "b" is the thickness of the thin portion 30MIN. The lager the value of the thickness unevenness rate (%) is, the smaller the difference between the thickness of the thick portion 30MAX and the thickness of the thin portion 30MIN is (also referred to as "the thickness unevenness being small").

The measured thickness unevenness rate (%) was as follows: 70.8% in Comparative Example 1; 74.8% in Comparative Example 2; 81.6% in Comparative Example 3; 84.3% in Comparative Example 4; 85.3% in Comparative Example 5; 88.2% in Example 1; 86.8% in Example 2; 87.3% in Example 3; 85.4% in Example 4; and 96.7% in Example 5. The thickness unevenness rate in Examples 1 to 5 was 85% or higher.

Next, a description will be given of evaluation on an electrical-insulating property (hereinafter, simply referred to as "insulating property") of the insulated wire 10. The insulating property of the insulated wire 10 was evaluated based on the intensity of dielectric breakdown, which is a value obtained by dividing a breakdown voltage of the insulating coating 30 by the thickness of the insulating coating 30. When the intensity of the dielectric breakdown is 167 V/μm or higher, the insulating property is evaluated as "excellent (○)". When the intensity of the dielectric breakdown is less than 167 V/μm, the insulating property is evaluated as "poor (x)".

The result of evaluation was as follows. The insulating property was: excellent (○) in Comparative Example 1; poor (x) in Comparative Example 2; poor (x) in Comparative Example 3; poor (x) in Comparative Example 4; poor (x) in Comparative Example 5; excellent (○) in Example 1; excellent (○) in Example 2; excellent (○) in Example 3; excellent (○) in Example 4; and excellent (○) in Example 5.

Next, a description will be given of evaluation on appearance of the insulated wire 10. The appearance of the insulated wire 10 was evaluated based on how many protrusions, with a protruding length of 100 μm or longer, are formed in the outer circumferential surface of the insulating coating 30 within a range of 200 meters (m) in the insulated wire 10. When there are three protrusions or less, the appearance is evaluated as excellent (○). When there are more than three protrusions, the appearance is evaluated as poor (x).

The result of evaluation was as follows. The appearance was: poor (x) in Comparative Example 1; poor (x) in Comparative Example 2; excellent (○) in Comparative Example 3; poor (x) in Comparative Example 4; excellent (○) in Comparative Example 5; excellent (○) in Example 1; excellent (○) in Example 2; excellent (○) in Example 3; excellent (○) in Example 4; and excellent (○) in Example 5.

The evaluation on the insulated wire 10 in the present embodiment can be summarized as follows.

The thickness difference in Examples 1 to 5 was 0.5 μm or less. The thickness unevenness rate was 85% or higher. In all of Examples 1 to 5, both the insulating property and the appearance were evaluated as excellent (○).

In contrast, the thickness difference in Comparative Examples 1 to 5 exceeded 0.5 μm. In Comparative Examples 1 to 4 excluding Comparative Example 5, the thickness unevenness rate was less than 85%. None of these Comparative Examples was evaluated as excellent (○) in respect of the insulating property and the appearance.

In the insulated wire 10 and the method for manufacturing the insulated wire 10 according to the configuration described above, by setting the value of the thickness difference to 0.5 μm or less, the thickness unevenness can be suppressed in the insulating layer 33 having the pores 35. Moreover, by setting the value of the thickness unevenness rate to 85% or higher, the thickness unevenness can be suppressed in the insulating layer 33 having the pores 35.

For example, in the insulating layer 33, a portion with a large thickness due to the thickness unevenness becomes less likely to be formed. The portion with a large thickness is a portion where a void is easily formed. When the portion with a large thickness becomes less likely to be formed, a void becomes less likely to be formed. Moreover, the value of the intensity of the dielectric breakdown easily satisfies 167 V/μm or higher. The number of the protrusions with a protruding length of 100 μm or longer can be easily reduced to three or less in the outer circumferential surface of the insulating coating 30 within a range of 200 m in the insulated wire 10.

By limiting the number of the protrusions to three or less, the percentage of the insulated wire 10 to be evaluated as poor (x) in appearance can be easily lowered as compared to the case where the number of the protrusions is limited to, for example, one or less, or two or less. In other words, decrease in production yield rate of the insulated wire 10 can be easily suppressed. Moreover, it is possible to easily reduce a situation where the insulated wire 10 evaluated as excellent (○) has poor appearance as compared to the case where the number of the protrusions is limited to four or five.

The die sequence is set in consideration for increase in the thickness of the insulating layer 33 due to the pores 35 to be formed. Thus, a gap (i.e., the die gap) between the die and each insulating layer 33 can be properly maintained and therefore, the thickness unevenness of the insulating layer 33 can be suppressed. By suppressing the thickness unevenness, it becomes possible to inhibit formation of a void due to the thick portion 30MAX. Thus, a defect in appearance and/or decrease in insulating property due to the void can be inhibited. In other words, it is possible to apply the insulating coating 30 with excellent appearance and insulating property.

Therefore, it is possible to provide the insulated wire 10 comprising the insulating coating 30 with a low dielectric constant and excellent appearance and insulating property.

What is claimed is:

1. An insulated wire comprising:

a conductor having an elongated shape; and an insulating coating provided around the conductor, the insulating coating being formed by laminating multiple insulating layers, each insulating layer including pores, wherein at a specific position of the insulating coating in a longitudinal direction thereof where no protrusions with a protruding length of 100 μm or longer are formed in an outer circumferential surface of the insulating coating, when an average value of respective thicknesses of the multiple insulating layers at a thick portion of the insulating coating having the largest thickness is defined as a first thickness and an average value of respective thicknesses of the multiple insulating layers at a thin portion of the insulating coating having the smallest thickness is defined as a second thickness, a thickness difference between the first thickness and the second thickness is 0.5 μm or less, and when a thickness of the thick portion is defined as a and a thickness of the thin portion is defined as b, a value of a thickness unevenness rate obtained by (b/a)×100 is 85.4% or more.

2. The insulated wire according to claim 1, wherein when a thickness of the thick portion is defined as a and a thickness of the thin portion is defined as b, a value of a thickness unevenness rate obtained by (b/a)×100 is 85 or more.

3. The insulated wire according to claim 2, wherein a value of an intensity of dielectric breakdown obtained by dividing a breakdown voltage by a thickness of the insulating coating satisfies 167 V/μm or higher.

4. The insulated wire according to claim 2, wherein an outer circumferential surface of the insulating coating includes three or less protrusions extending by a protruding length of 100 μm or longer within a range of 200 m in the insulated wire.

5. The insulated wire according to claim 1, wherein a value of an intensity of dielectric breakdown obtained by dividing a breakdown voltage by a thickness of the insulating coating satisfies 167 V/μm or higher.

6. The insulated wire according to claim 1, wherein an outer circumferential surface of the insulating coating includes three or less protrusions extending by a protruding length of 100 μm or longer within a range of 200 m in the insulated wire.

7. A method for manufacturing an insulated wire comprising:

a first application process including applying a coating material containing a polyamide acid to a circumference of a conductor, the coating material being obtained by (i) adding a pore forming agent to a solvent by a specific part by weight with respect to a resin component in the coating material before synthesis and (ii) stirring and mixing the coating material;

a first thickness adjusting process including inserting the conductor applied with the coating material through a first through-hole of a first die, to thereby adjust a thickness of the coating material applied to the circumference of the conductor to a specific thickness; and a first insulating layer forming process including:

heating the coating material having the specific thickness to a specific temperature, to thereby remove the solvent in the coating material;

imidizing the polyamide acid contained in the coating material in a state where phase separation occurs between the pore forming agent and the polyamide acid; and thermally decomposing or vaporizing the pore forming agent contained in the coating material, to thereby form an insulating layer, wherein the resin component and the pore forming agent are regarded as apparent non-volatile components, and a thickness of the insulating layer is determined based on the apparent non-volatile components, and wherein, in the first thickness adjusting process, the specific thickness is determined based on a sum of volumes of the resin component and the pore forming agent, which are contained in the coating material, with respect to a volume of the coating material.

8. The method for manufacturing an insulated wire according to claim 7, wherein the method further comprises:

a second application process including applying the coating material to the circumference of the conductor including the insulating layer;

a second thickness adjusting process including inserting the conductor that includes the insulating layer applied with the coating material through a second die including a second through-hole, to thereby adjust a thickness of the coating material applied to the circumference of the conductor including the insulating layer to the specific thickness, the second through-hole being larger than the first through-hole; and a second insulating layer forming process including:

heating the coating material having the specific thickness to a specific temperature, to thereby remove the solvent in the coating material;

imidizing the polyamide acid contained in the coating material in a state where phase separation occurs between the pore forming agent and the polyamide acid; and thermally decomposing or vaporizing the pore forming agent contained in the coating material, to thereby form another insulating layer.

9. The method for manufacturing an insulated wire according to claim 7, wherein the method further comprises: a second application process including applying the coating material to the circumference of the conductor including the insulating layer; a second thickness adjusting process including inserting the conductor that includes the insulating layer applied with the coating material through a second die including a second through-hole, to thereby adjust a thickness of the coating material applied to the circumference of the conductor including the insulating layer to the specific thickness, the second through-hole being larger than the first through-hole; and a second insulating layer forming process including: heating the coating material having the specific thickness to a specific temperature, to thereby remove the solvent in the coating material; imidizing the polyamide acid contained in the coating material in a state where phase separation occurs between the pore forming agent and the polyamide acid; and thermally decomposing or vaporizing the pore forming agent contained in the coating material, to thereby form another insulating layer.

* * * * *